US012412392B2

(12) United States Patent
Colamatteo et al.

(10) Patent No.: US 12,412,392 B2
(45) Date of Patent: Sep. 9, 2025

(54) SPORTS NEURAL NETWORK CODEC

(71) Applicant: STATS LLC, Chicago, IL (US)

(72) Inventors: Valerio Colamatteo, Milan (IT); Christopher Evi-Parker, London (GB); Sateesh Padagadi, London (GB); Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 295 days.

(21) Appl. No.: 18/050,331

(22) Filed: Oct. 27, 2022

(65) Prior Publication Data

US 2023/0148112 A1    May 11, 2023

Related U.S. Application Data

(60) Provisional application No. 63/263,189, filed on Oct. 28, 2021.

(51) Int. Cl.
G06V 10/20 (2022.01)
G06V 10/44 (2022.01)
(Continued)

(52) U.S. Cl.
CPC ............ G06V 20/42 (2022.01); G06V 10/778 (2022.01)

(58) Field of Classification Search
CPC .... G06V 20/42; G06V 10/778; G06V 10/255; G06V 10/454; G06V 10/82; H04N 19/70;
(Continued)

(56) References Cited

U.S. PATENT DOCUMENTS

2008/0192116 A1   8/2008  Tamir et al.
2011/0013836 A1   1/2011  Gefen et al.
(Continued)

FOREIGN PATENT DOCUMENTS

CN    111951249 A  * 11/2020
CN    112115914 A  * 12/2020  ......... G06K 9/00664
(Continued)

OTHER PUBLICATIONS

PCT International Application No. PCT/US22/78794, International Search Report and Written Opinion of the International Searching Authority, dated Feb. 2, 2023, 11 pages.
(Continued)

Primary Examiner — John Villecco
Assistant Examiner — Kyla Guan-Ping Tiao Allen
(74) Attorney, Agent, or Firm — Bookoff McAndrews PLLC

(57) ABSTRACT

A computing system receives a broadcast video stream of a game. A codec module of the computing system extracts image level features from the broadcast video stream. The codec module includes an object detection portion configured to detect players in the broadcast video stream and a subnet portion attached to the object detection portion. The subnet portion is configured to identify foreground information of the detected players. The codec module provides the image level features to a plurality of task specific modules for analysis. The plurality of task specific modules generates a plurality of outputs based on the image level features.

20 Claims, 5 Drawing Sheets

(51) Int. Cl.
  *G06V 10/778* (2022.01)
  *G06V 10/82* (2022.01)
  *G06V 20/40* (2022.01)
  *G06V 40/10* (2022.01)
  *H04N 21/234* (2011.01)

(58) Field of Classification Search
  CPC .. H04N 19/176; H04N 19/172; H04N 19/597; H04N 19/46; H04N 21/8456; G06N 3/045; G06N 3/08; G06T 2207/10016
  See application file for complete search history.

(56) References Cited

U.S. PATENT DOCUMENTS

| | | | |
|---|---|---|---|
| 2011/0268320 | A1 | 11/2011 | Huang et al. |
| 2016/0292510 | A1 | 10/2016 | Han et al. |
| 2017/0344884 | A1 | 11/2017 | Lin et al. |
| 2019/0221001 | A1* | 7/2019 | Dassa ............... G06N 3/045 |
| 2020/0234051 | A1* | 7/2020 | Lee ............... G06V 10/764 |
| 2020/0394413 | A1 | 12/2020 | Bhanu et al. |
| 2022/0292311 | A1* | 9/2022 | Song ............... G06V 10/774 |
| 2024/0161461 | A1* | 5/2024 | Zu ............... G06V 10/82 |

FOREIGN PATENT DOCUMENTS

| | | | | |
|---|---|---|---|---|
| WO | WO-2020237215 | A1 * | 11/2020 | ......... G06F 18/2155 |
| WO | 2021016901 | | 2/2021 | |

OTHER PUBLICATIONS

He Kaiming et al: "Mask R-CNN", Jan. 24, 2018 (Jan. 24, 2018), XP055930853, Retrieved from the Internet:URL: https://arxiv.org/pdf/1703.06870.pdf [retrieved on Jun. 14, 2022].

Jacek Komorowski et al: "FootAndBall: Integraed player and ball detector", ARXIV.ORG, Cornell University Library, 201 Olin Library Cornell University Ithaca, NY 14853, Oct. 26, 2020 (Oct. 26, 2020), XP081799873.

Pobar Miran et al: "Mask R-CNN and Optical Flow Based Method for Detection and Marketing of Handball Actions", 2018 11TH International Congress on Image and Signal Processing, Biomedical Engineering and Informatics (CISP-BMEI), IEEE, Oct. 2018 (Oct. 13, 2018), pp. 1-6, XP033511738.

Roman Voeikov et al: "TTNet: Real-time temporal and spatial video analysis of table tennis", ARXIV.ORG, Cornell University Library, 201 Olin Library Cornell University Ithaca, NY 14853, Apr. 21, 2020 (Apr. 21, 2020), XP081649342.

Sah Melike et al: "Review and evaluation of player detection methods in field sports: Comparing conventional and deep learning based methods", Multimedia Tools and Applications., [Online] vol. 82, No. 9, Jun. 3, 2021 (Jun. 3, 2021), pp. 13141-13165, XP093265850, US ISSN: 1380-7501, DOI: 10.1007/s11042-021-11071-z Retrieved from the Internet:URL:https://link.springer.com/article/10.1007/s11042-021-11071-z/fulltext.html>[retrieved on Apr. 2, 2025].

Zhang Yiqing et al: "Mask-Refined R-CNN: A Network for Refining Object Details in Instancce Segmentation", Sensors, vol. 20, No. 4, Feb. 13, 2020 (Feb. 13, 2020), p. 1010, XP093266346.

* cited by examiner

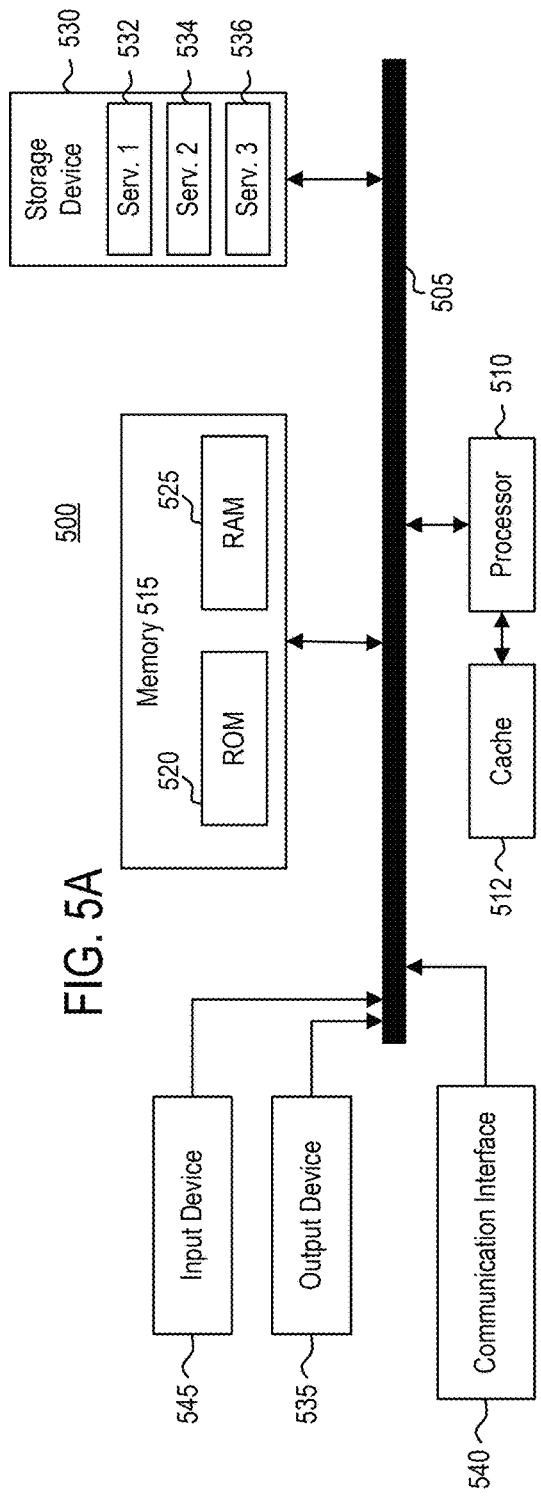
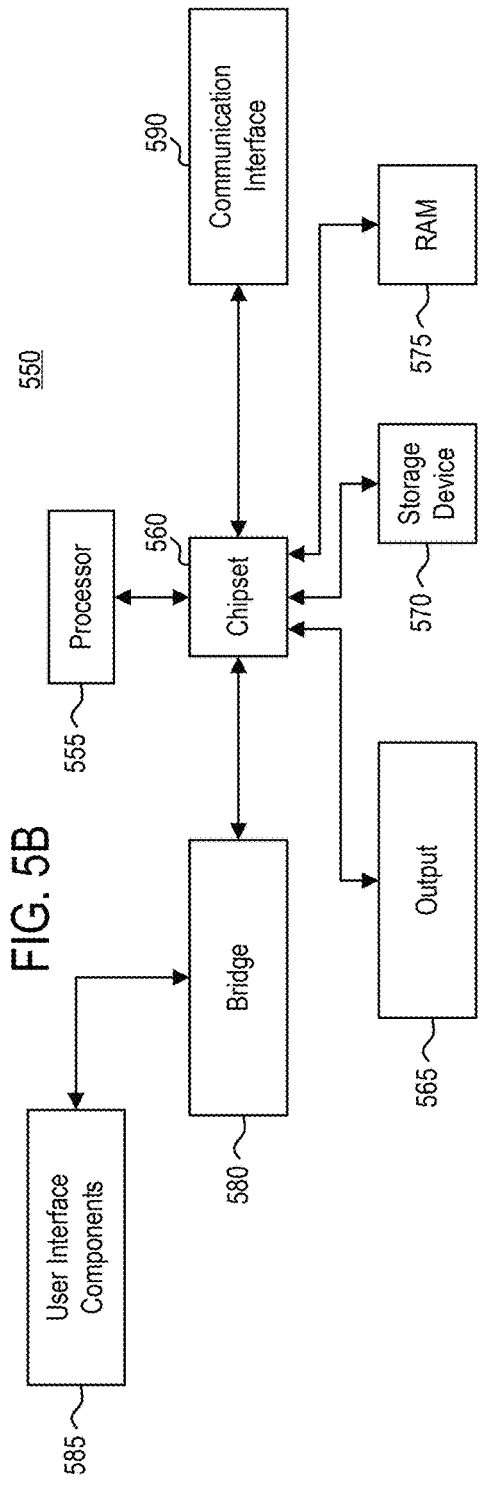

SPORTS NEURAL NETWORK CODEC

CROSS-REFERENCE TO RELATED APPLICATIONS

This application claims priority to U.S. Provisional Application Ser. No. 63/263,189, filed Oct. 28, 2021, which is hereby incorporated by reference in its entirety.

FIELD OF THE DISCLOSURE

The present disclosure generally relates to sports neural network encoder for sporting contests.

BACKGROUND

Increasingly, users are opting to forego a traditional cable subscription in favor of one of the various streaming services readily available today. With this shift, leagues across a variety of sports have become more interested in contracting with one of these streaming services for providing their content to end users.

SUMMARY

In some embodiments, a method is disclosed herein. A computing system receives a broadcast video stream of a game. A codec module of the computing system extracts image level features from the broadcast video stream. The codec module includes an object detection portion configured to detect players in the broadcast video stream and a subnet portion attached to the object detection portion. The subnet portion is configured to identify foreground information of the detected players. The codec module provides the image level features to a plurality of task specific modules for analysis. The plurality of task specific modules generates a plurality of outputs based on the image level features.

In some embodiments, a non-transitory computer readable medium is disclosed herein. The non-transitory computer readable medium includes one or more sequences of instructions, which, when executed by a processor, causes a computing system to perform operations. The operations include receiving, by the computing system, a broadcast video stream of a game. The operations further include extracting, via a codec module of the computing system, image level features from the broadcast video stream. The codec module includes an object detection portion configured to detect players in the broadcast video stream and a subnet portion attached to the object detection portion. The subnet portion is configured to identify foreground information of the detected players. The operations further include providing, by the codec module, the image level features to a plurality of task specific modules for analysis. The operations further include generating, by the plurality of task specific modules, a plurality of outputs based on the image level features.

In some embodiments, a system is disclosed herein. The system includes a processor and a memory. The memory has programming instructions stored thereon, which, when executed by the processor, causes the system to perform operations. The operations include receiving a broadcast video stream of a game. The operations further include extracting, via a codec module, image level features from the broadcast video stream. The codec module includes an object detection portion configured to detect players in the broadcast video stream and a subnet portion attached to the object detection portion. The subnet portion is configured to identify foreground information of the detected players. The operations further include providing, by the codec module, the image level features to a plurality of task specific modules for analysis. The operations further include generating, by the plurality of task specific modules, a plurality of outputs based on the image level features.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 5A is a block diagram illustrating a computing device, according to example embodiments.

FIG. 5B is a block diagram illustrating a computing device, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The efficient extraction of human understandable data in sports vision analysis is typically a highly computational process based on the accomplishment of multiple tasks through stand-alone designs and developed modules. Conventionally, these modules are typically sequentially stacked for producing the desired output (e.g., player position, court geometry, etc.). This working schema is vertically structured and, thus, computationally highly redundant because each module independently encodes and decodes information from a single visual input.

Further, conventional approaches to object detection are unable to also support the identification of foreground information of the objects. Conventionally, operators had to employ two separate models: a first model configured to detect objects; and a second model configured to identify foreground information of the objects. In the context of real-time applications, such as in detecting players in sports, such two-step approach is time consuming and cannot support real-time functionality.

To improve upon conventional processes, one or more techniques provided herein provide a universal approach for unifying many of sports' visual information extraction tasks into a single framework. Such functionality may be accomplished by attaching a mask subnet to an object detection module. This approach allows for object detection and foreground identification using a single machine learning architecture. In this manner, the architecture disclosed herein can be efficiently deployed in real-time applications.

Figure 1:
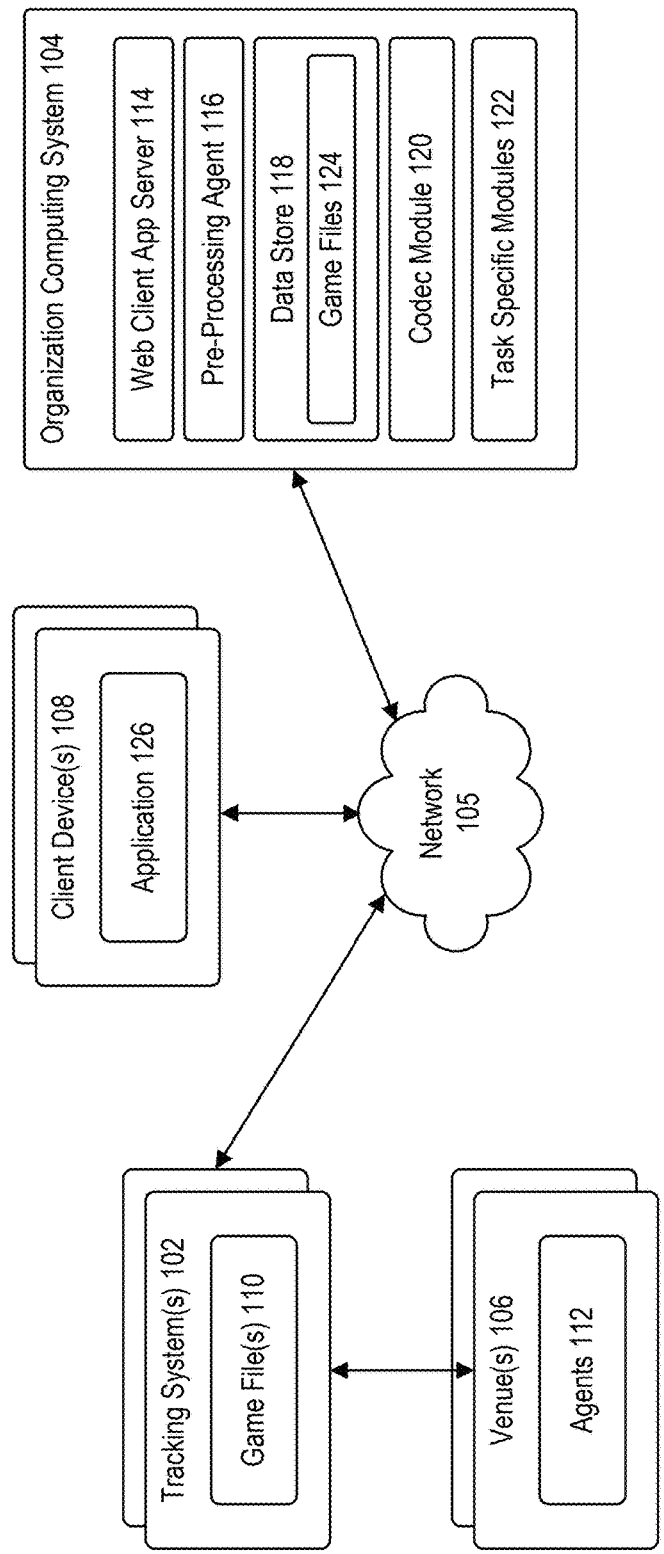
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. For example, tracking system 102 may be configured to provide organization computing system 104 with a broadcast stream of a game or event in real-time or near real-time via network 105.

Organization computing system 104 may be configured to process the broadcast stream of the game and provide various insights or metrics related to the game to client devices 108. Organization computing system 104 may include at least a web client application server 114, a pre-processing agent 116, data store 118, codec module 120, and task specific modules 122. Each of pre-processing agent 116, codec module 120, and task specific modules 122 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include video data of a given match. For example, the video data may correspond to a plurality of video frames captured by tracking system 102. In some embodiments, the video data may correspond to broadcast data of a given match, in which case, the video data may correspond to a plurality of video frames of the broadcast feed of a given match.

Pre-processing agent 116 may be configured to process data retrieved from data store 118. For example, pre-processing agent 116 may be configured to generate game files 124 stored in data store 118. For example, pre-processing agent 116 may be configured to generate a game file 124 based on data captured by tracking system 102. In some embodiments, pre-processing agent 116 may further be configured to store tracking data associated with each game in a respective game file 124. Tracking data may refer to the (x, y) coordinates of all players and balls on the playing surface during the game. In some embodiments, pre-processing agent 116 may receive tracking data directly from tracking system 102. In some embodiments, pre-processing agent 116 may derive tracking data from the broadcast feed of the game.

Codec module 120 may be configured to process broadcast video data received by organization computing system 104. In some embodiments, codec module 120 may process broadcast video data in real-time or near-real time. Codec module 120 may be representative of a neural network architecture configured to extract a plurality of features from the broadcast video data for downstream analysis by task specific modules 122. Codec module 120 may be configured to generate input serving multiple task specific modules 122. Such architecture may allow codec module 120 to function as a generalized sports image encoder. Exemplary features that may be extracted may include, but are not limited to, player detection during the game, discerning players form spectators, playing ball detection, team identification related to any player on the playing surface, jersey numbers optical detection and recognition, player re-identification by appearance, instance segmentation, score board detection, and the like.

Codec module 120 may successively refine one or more encodings (which may include the embeddings) of the input visual data by distributing the encodings to several heads of the neural network architecture for single task specialization. This multiplicity of sports-encoding heads with a single features' extraction moment allows for reuse of backbone encodings in a runtime efficient manner due to the parallelism. As such, codec module 120 may be suitable for both on-line and off-line analysis.

Task specific modules 122 may be representative of various prediction models for generating insights or statistics related to events within the broadcast video data feed. In some embodiments, task specific modules 122 may receive output from codec module 120 for generating downstream predictions. For example, task specific modules 122 may be provided with various features extracted from the broadcast video data feed from codec modules 120. Exemplary features may include, but are not limited to, foreground pixel locations and player location information.

Client device 108 may be in communication with organization computing system 104 via network 105. Client device 108 may be operated by a user. For example, client device 108 may be a mobile device, a tablet, a desktop computer, a set-top box, a streaming player, or any computing system capable of receiving, rendering, and presenting video data to the user. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 126. Application 128 may be representative of a web browser that allows access to a website or a stand-alone application. Client device 108 may access application 126 to access one or more functionalities of organization computing system 104. Client device 108 may communicate over network 105 to request a webpage, for example, from web client application server 114 of organization computing system 104. For example, client device 108 may be configured to execute application 126 to access one or more insights or statistics generated by task specific modules 122. The content that is displayed to client device 108 may be transmitted from web client application server 114 to client device 108, and subsequently processed by application 126 for display through a graphical user interface (GUI) of client device 108.

Figure 2:
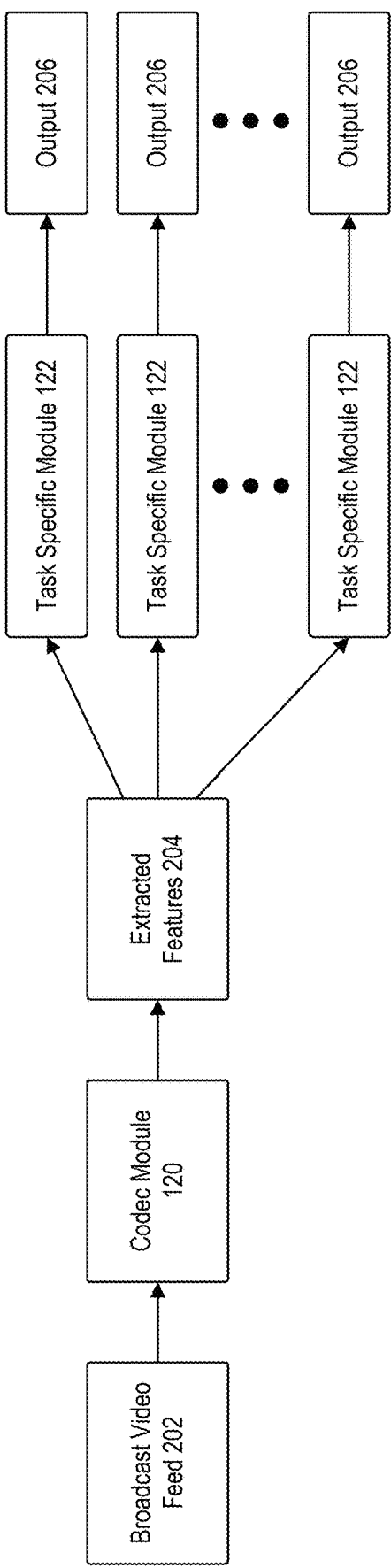
FIG. 2 is a block diagram that illustrates exemplary components of computing system, according to example embodiments.

FIG. 2 is a block diagram that illustrates exemplary components of computing environment 100, according to example embodiments. As shown, a broadcast video stream 202 may be provided to codec module 120. Codec module 120 may be configured to extract features 204 from the broadcast video feed. Exemplary features 204 may include, but are not limited to player detection during the game, discerning players form spectators, playing ball detection, team identification related to any player on the playing surface, jersey numbers optical detection and recognition, player re-identification by appearance, instance segmentation, score board detection, and the like. Features 204 may be provided by codec module 120 to task specific modules 122 for downstream processing. For example, task specific modules 122 may utilize features 204 to generate various insights or statistics (e.g., output 206) related to events in the broadcast video stream. In this manner, codec module 120 may only need to process the broadcast video feed once and pass those extracted features to task specific modules 122.

Figure 3:
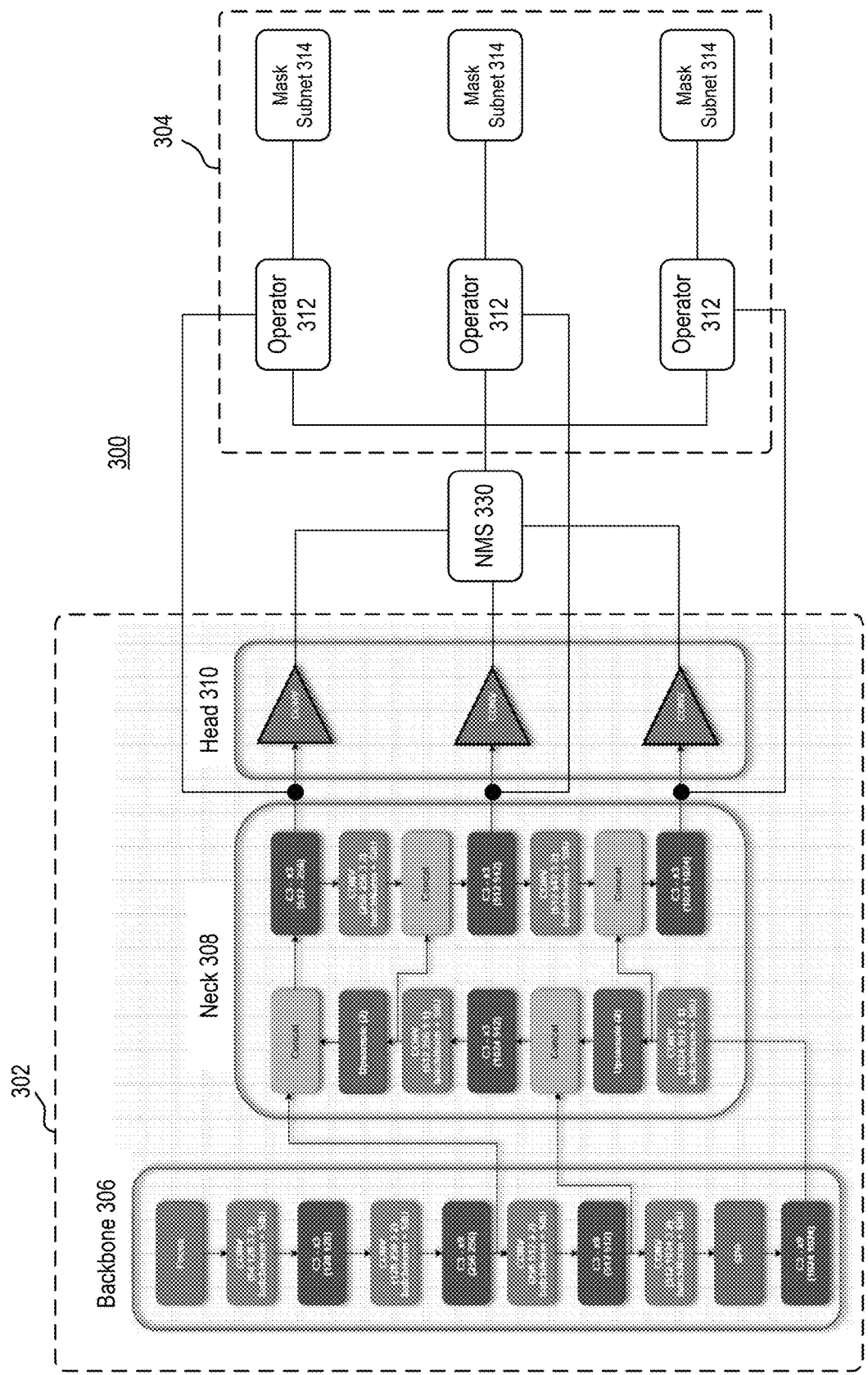
FIG. 3 is a block diagram that illustrates a machine learning architecture implemented by codec module, according to example embodiments.

FIG. 3 is a block diagram that illustrates a machine learning architecture 300 implemented by codec module 120, according to example embodiments.

As shown, machine learning architecture 300 may include an object detection portion 302 with an attached subnet portion 304. Object detection portion 302 may be trained to identify objects in a video. For example, object detection portion 302 may be trained to identify players in a broadcast video stream. In some embodiments, object detection portion 302 may be representative of an object detection architecture, such as, but not limited to, a YOLOV5 architecture. YOLOv5 architecture is an object detection algorithm that is configured to divide images into a grid system, with each grid responsible for detecting objects within itself.

As shown, object detection portion 302 may include a backbone 306, a neck 308, and a head 310. Backbone 306 may be configured to extract image level features from the video. In some embodiments, backbone 306 may be representative of a convolutional neural network architecture. For example, as shown, backbone 306 may include several convolutional layers configured to extract the image features. Backbone 306 may provide extracted image level features to neck 308. Neck 308 may be configured to aggregate the extracted image level features. For example, neck 308 may be configured to collect image level features from a plurality of different levels. In some embodiments, the output generated by neck 308 may be representative of floating point values that indicate a likely position of objects or players in the video. Head 310 may be configured to identify a location of objects in the video based on input from neck 308. For example, head 310 may include a plurality of convolutions. Each convolution may be configured to use different resolutions to extract image features to detect player location in the video. In this manner, head 310 may increase or improve the stability of detection across different environments. Accordingly, in some embodiments, as output, object detection portion 302 may provide player locations in the video.

In some embodiments, output from each convolutional may be provided to a non-maximum suppression (NMS) function 330. NMS function 330 may be configured to take each bounding box coordinate generated by the plurality of convolutions for a given player and combine them into a single bounding box identifying a location of the player.

Subnet portion 304 may be attached to object detection portion 302. For example, as shown, subnet portion 304 may be attached to object detection portion 302 to the output of neck 308. Accordingly, in this manner, subnet portion 304 may receive, as input, the direct output from neck 308 as well as the output generated from NMS function 330.

Subnet portion 304 may include a plurality of operators 312 and a plurality of mask subnets 314. In some embodiments, each operator of plurality of operators 312 may be representative of a region of interest align (RoIAlign) operation. Output from plurality of operators 312 may be provided to a respective mask subnet 314. Mask subnet 314 may be configured to generate pixel level information to detect the foreground information of each player. In some embodiments, mask subnet 314 may use thresholding to generate a player mask.

In this manner, machine learning architecture 300 is able to detect player locations in a video feed and generate foreground information that may be used for downstream processes using a single model.

In some embodiments, training machine learning architecture 300 to detect player locations and generate foreground information may be done in a two-step process. For example, in some embodiments, object detection portion 302 may be first trained independent of subnet portion 304. In this manner, object detection portion 302 may achieve a threshold level of accuracy for detecting player locations in the video feed. Following training of object detection portion 302, subnet portion 304 may be attached to neck 308 for further training. In some embodiments, the initial weights of machine learning architecture 300 with subnet portion 304 attached to object detection portion 302 may be set to the final weights generated during independent training of object detection portion 302.

Figure 4:
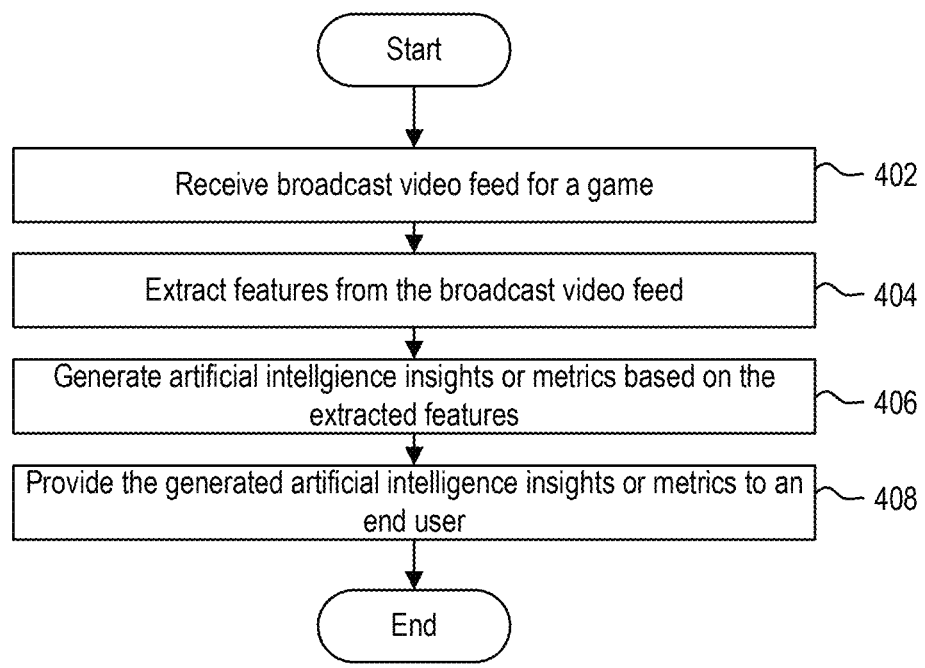
FIG. 4 is a flow diagram illustrating a method of processing a broadcast video feed, according to example embodiments.

FIG. 4 is a flow diagram illustrating a method 400 of generating interactive broadcast video data, according to example embodiments. Method 400 may begin at step 402.

At step 402, organization computing system 104 may receive a broadcast video stream for a game or event. In some embodiments, broadcast video stream may be provided by tracking system 102. In some embodiments, the broadcast video stream may be provided in real-time or near real-time.

At step 404, organization computing system 104 may extract features from the broadcast video stream. For example, codec module 120 may be representative of a neural network backbone configured to analyze and extract a plurality of features from the broadcast video stream. Exemplary features 204 may include, but are not limited to player detection during the game, discerning players form spectators, playing ball detection, team identification related to any player on the playing surface, jersey numbers optical detection and recognition, player re-identification by appearance, instance segmentation, score board detection, and the like.

At block 406, organization computing system 104 may generate a plurality of artificial intelligence insights or metrics based on the extracted features. For example, codec module 120 may feed or provide input to multiple heads, i.e., task specific modules 122. Task specific modules 122 may utilize the extracted features to generate the plurality of artificial intelligence insights or metrics. Due to the architecture of codec module 120, codec module 120 does not need to extract features each time for each task specific module 122. Instead, codec module 120 may extract the plurality of features in a single pass, and may provide those features to task specific modules 122 for analysis.

At block 408, organization computing system 104 may the artificial intelligence insights or metrics to an end user. For example, organization computing system 104 may provide the artificial intelligence insights or metrics to application 126 executing on client device 108

FIG. 5A illustrates an architecture of computing system 500, according to example embodiments. System 500 may be representative of at least a portion of organization computing system 104. One or more components of system 500 may be in electrical communication with each other using a bus 505. System 500 may include a processing unit (CPU or processor) 510 and a system bus 505 that couples various system components including the system memory 515, such as read only memory (ROM) 520 and random access memory (RAM) 525, to processor 510. System 500 may include a cache of high-speed memory connected directly with, in close proximity to, or integrated as part of processor 510. System 500 may copy data from memory 515 and/or storage device 530 to cache 512 for quick access by processor 510. In this way, cache 512 may provide a performance boost that avoids processor 510 delays while waiting for data. These and other modules may control or be configured to control processor 510 to perform various actions. Other system memory 515 may be available for use as well. Memory 515 may include multiple different types of memory with different performance characteristics. Processor 510 may include any general purpose processor and a hardware module or software module, such as service 1 532, service 2 534, and service 3 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the computing system 500, an input device 545 may represent any number of input mechanisms, such as a microphone for speech, a touch-sensitive screen for gesture or graphical input, keyboard, mouse, motion input, speech and so forth. An output device 535 (e.g., display) may also be one or more of a number of output mechanisms known to those of skill in the art. In some instances, multimodal systems may enable a user to provide multiple types of input to communicate with computing system 500. Communications interface 540 may generally govern and manage the user input and system output. There is no restriction on operating on any particular hardware arrangement and therefore the basic features here may easily be substituted for improved hardware or firmware arrangements as they are developed.

Storage device 530 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 may include services 532, 534, and 536 for controlling the processor 510. Other hardware or software modules are contemplated. Storage device 530 may be connected to system bus 505. In one aspect, a hardware module that performs a particular function may include the software component stored in a computer-readable medium in connection with the necessary hardware components, such as processor 510, bus 505, output device 535, and so forth, to carry out the function.

FIG. 5B illustrates a computer system 550 having a chipset architecture that may represent at least a portion of organization computing system 104. Computer system 550 may be an example of computer hardware, software, and firmware that may be used to implement the disclosed technology. System 550 may include a processor 555, representative of any number of physically and/or logically distinct resources capable of executing software, firmware, and hardware configured to perform identified computations. Processor 555 may communicate with a chipset 560 that may control input to and output from processor 555. In this example, chipset 560 outputs information to output 565, such as a display, and may read and write information to storage device 570, which may include magnetic media, and solid-state media, for example. Chipset 560 may also read data from and write data to RAM 575. A bridge 580 for interfacing with a variety of user interface components 585 may be provided for interfacing with chipset 560. Such user interface components 585 may include a keyboard, a microphone, touch detection and processing circuitry, a pointing device, such as a mouse, and so on. In general, inputs to system 550 may come from any of a variety of sources, machine generated and/or human generated.

Chipset 560 may also interface with one or more communication interfaces 590 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 555 analyzing data stored in storage device 570 or RAM 575. Further, the machine may receive inputs from a user through user interface components 585 and execute appropriate functions, such as browsing functions by interpreting these inputs using processor 555.

It may be appreciated that example systems 500 and 550 may have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
receiving, by a computing system, a broadcast video stream of a game;
extracting, via a codec module of the computing system, image level features from the broadcast video stream, the codec module comprising an object detection portion that detects players in the broadcast video stream and a subnet portion attached to and downstream of the object detection portion, wherein the subnet portion identifies foreground information of the detected players;
providing, by the codec module, the image level features to a plurality of task specific modules for analysis; and
generating, by the plurality of task specific modules, a plurality of outputs based on the image level features.

2. The method of claim 1, wherein the object detection portion comprises:
a backbone that extracts image level features from the broadcast video stream;
a neck downstream of the backbone, wherein the neck aggregates the extracted image level features; and
a head downstream of the neck, wherein the head identifies locations of players in the broadcast video stream based on the extracted image level features.

3. The method of claim 2, wherein the head comprises a plurality of convolutions, wherein each convolution identifies a location of a player at varying resolutions.

4. The method of claim 3, wherein the codec module further comprises:
a non-maximum suppression function downstream of the head, wherein the non-maximum suppression function combines the identified locations of the player at varying resolutions to generate a single location for the player.

5. The method of claim 2, wherein the subnet portion is attached to the neck.

6. The method of claim 2, wherein the subnet portion receives input from the neck, wherein the input from the neck is output generated by the neck, the output comprising floating point values indicating a likely position of players in the broadcast video stream.

7. The method of claim 1, further comprising:
training, by the computing system, the object detection portion independent of the subnet portion; and
after training the object detection portion, training, by the computing system, the object detection portion with the subnet portion attached thereto.

8. A non-transitory computer readable medium comprising one or more sequences of instructions, which, when executed by a processor, causes a computing system to perform operations comprising:
receiving, by the computing system, a broadcast video stream of a game;
extracting, via a codec module of the computing system, image level features from the broadcast video stream, the codec module comprising an object detection portion that detects players in the broadcast video stream and a subnet portion attached to and downstream of the object detection portion, wherein the subnet portion identifies foreground information of the detected players;
providing, by the codec module, the image level features to a plurality of task specific modules for analysis; and
generating, by the plurality of task specific modules, a plurality of outputs based on the image level features.

9. The non-transitory computer readable medium of claim 8, wherein the object detection portion comprises:
a backbone that extracts image level features from the broadcast video stream;
a neck downstream of the backbone, wherein the neck aggregates the extracted image level features; and
a head downstream of the neck, wherein the head identifies locations of players in the broadcast video stream based on the extracted image level features.

10. The non-transitory computer readable medium of claim 9, wherein the head comprises a plurality of convolutions, wherein each convolution identifies a location of a player at varying resolutions.

11. The non-transitory computer readable medium of claim 10, wherein the codec module further comprises:
a non-maximum suppression function downstream of the head, wherein the non-maximum suppression function combines the identified locations of the player at varying resolutions to generate a single location for the player.

12. The non-transitory computer readable medium of claim 9, wherein the subnet portion is attached to the neck.

13. The non-transitory computer readable medium of claim 9, wherein the subnet portion receives input from the neck, wherein the input from the neck is output generated by the neck, the output comprising floating point values indicating a likely position of players in the broadcast video stream.

14. The non-transitory computer readable medium of claim 8, further comprising:
training, by the computing system, the object detection portion independent of the subnet portion; and
after training the object detection portion, training, by the computing system, the object detection portion with the subnet portion attached thereto.

15. A system comprising:
a processor; and
a memory having programming instructions stored thereon, which, when executed by the processor, cause the system to perform operations comprising:
receiving a broadcast video stream of a game;
extracting, via a codec module, image level features from the broadcast video stream, the codec module comprising an object detection portion that detects players in the broadcast video stream and a subnet portion attached to and downstream of the object detection portion, wherein the subnet portion identifies foreground information of the detected players;
providing, by the codec module, the image level features to a plurality of task specific modules for analysis; and
generating, by the plurality of task specific modules, a plurality of outputs based on the image level features.

16. The system of claim 15, wherein the object detection portion comprises:
a backbone that extracts image level features from the broadcast video stream;
a neck downstream of the backbone, wherein the neck aggregates the extracted image level features; and
a head downstream of the neck, wherein the head identifies locations of players in the broadcast video stream based on the extracted image level features.

17. The system of claim 16, wherein the head comprises a plurality of convolutions, wherein each convolution identifies a location of a player at varying resolutions.

18. The system of claim 17, wherein the codec module further comprises:
a non-maximum suppression function downstream of the head, wherein the non-maximum suppression function combines the identified locations of the player at varying resolutions to generate a single location for the player.

19. The system of claim 16, wherein the subnet portion receives input from the neck, wherein the input from the neck is output generated by the neck, the output comprising floating point values indicating a likely position of players in the broadcast video stream.

20. The system of claim 15, further comprising:
training the object detection portion independent of the subnet portion; and
after training the object detection portion, training the object detection portion with the subnet portion attached thereto.

* * * * *